(12) United States Patent
Hewlett

(10) Patent No.: US 6,278,563 B1
(45) Date of Patent: Aug. 21, 2001

(54) SCROLLING COLOR CHANGER

(75) Inventor: William Hewlett, Birmingham (GB)

(73) Assignee: Light & Sound Design, Ltd., Birmingham (GB)

( * ) Notice: Subject to any disclaimer, the term of this patent is extended or adjusted under 35 U.S.C. 154(b) by 0 days.

(21) Appl. No.: 08/731,418

(22) Filed: Oct. 15, 1996

(51) Int. Cl.[7] .................. G02B 5/22; G02B 7/00; F21V 9/00

(52) U.S. Cl. .......... 359/888; 359/889; 359/887; 359/890; 359/891; 359/892; 362/293; 362/281

(58) Field of Search .................... 359/887, 888, 359/889, 890, 891, 892; 362/293, 268, 281; 385/35, 71

(56) References Cited

U.S. PATENT DOCUMENTS

| | | | |
|---|---|---|---|
| 3,260,152 | 7/1966 | Aston | 359/888 |
| 4,459,014 | 7/1984 | Thebault | 359/887 |
| 4,600,976 | 7/1986 | Callahan | 362/293 |
| 4,602,321 | 7/1986 | Bornhorst | 362/293 |
| 4,745,531 | 5/1988 | Leclercq | 362/293 |
| 5,126,886 | 6/1992 | Richardson et al. | 359/888 |

Primary Examiner—Audrey Chang
(74) Attorney, Agent, or Firm—Fish & Richardson P.C.

(57) ABSTRACT

A combination color filter having at least two dual-hue color-changing absorptive substrates. A desired hue and saturation is achieved by using light absorbing gels for a plurality of selected hues, preferably the three subtractive primary colors. The unique arrangement of transparent part, saturation parts and continuously graded saturation parts allow fast color bumping between any two primary colors without flash of white and presence of other intervening colors.

9 Claims, 2 Drawing Sheets

SCROLLING COLOR CHANGER

FIELD OF THE INVENTION

The present invention relates to optical filters for generating light of a variety of hues and saturations by using a white light source. More specifically, the present invention describes variable color filters used in scrolling color changers.

BACKGROUND AND SUMMARY OF THE INVENTION

Generation of hues and saturations in visible spectrum with a broad-spectral white light source has a number of applications including stage lighting. Notably, many colored spotlight projectors use one or more colored optical filters to produce a light of desired hue and saturation by projecting a white light beam through the filters.

Two approaches are usually used to generate colored light. One is to first generate three light beams of three primary additive colors (i.e., red, green, and blue) and then combine them to produce the desired hue and saturation. White light sources can be used to generate three white light beams. These beams subsequently pass through three color filters respectively to obtain color from the three additive primary colors. Dichroic beam combiners, light intensity filters and other optical elements are used to combine the three beams into a single output beam. Adjusting intensities of the three beams in primary colors relative to one another allows the output beam to have various desired hues, saturations, and brightness. One of the disadvantages of such a system is the precise overlapping alignment of the three beams in primary colors is subject to change due to vibrations and other factors. The optical alignment requires frequent maintenance. The optical elements required in this type of system add manufacturing cost.

Another often-used approach uses two or more variable color filters in three subtractive primary colors (i.e., magenta, cyan and yellow) of different saturations to sequentially filter a single white beam, resulting in output light with desired hues and saturations. This approach simplifies the optical alignment using fewer optical elements in comparision with the former approach. In particular, this approach obviates the problem of having three displaced colors in the peripheral region of the output beam present in the former approach.

One key component of the latter approach is implementation of variable color filters, or a color changer based on subtractive primary colors. Many such color changer systems have been developed such as those described in U.S. Pat. Nos. 4,459,014 to Theabult, 4,600,976 to Callahan, 4,745,531 to Leclercq, 4,602,321 to Bornhorst, and 3,260,152 to Aston. However, these prior-art systems have limitations either in uniformity of color filtering or in light intensity handling capacity.

Scrolling color changers use two or more flexible transparencies coated with color changing materials having strong absorption at different selected hues and saturations of color. Different portions of the scrolling transparencies produce different hues and saturations in the light transmitting therethrough. These transparencies work combination to change the color of the output light from a single white light source. This can be understood with the well-known color triangle 100 shown in FIG. 1. The three additive primary colors red, green and blue are represented by the three vertices 102, 104 and 106, respectively. The three subtractive primary colors magenta, yellow and cyan are represented by 122, 124 and 126, respectively. The center 130 of the triangle 100 is the white color. For example, fully saturated red can be achieved by using a filtering portion for fully saturated yellow and a filter portion for fully saturated magenta.

The above-referenced flexible filters made of transparencies having color changing absorbing materials can be made with materials and processes disclosed in the U.S. patent application Ser. No. 08/286,969, disclosure of which is incorporated herein by reference. The flexible tranparent substrates can be polycarbonate, polyestere or polypropylene films. The color changing materials can be a mixture of dye for a particualr color and a polyester binder for holding the dye molecules.

The prior-art scrolling color changers can produce a uniformly filtered output beam and have a wide range of hues and saturations. However, these systems are usually slow and are usually obliged to produce undesired intervening colors in changing from one primary color to another.

One notable prior-art scrolling color changer is disclosed in U.S. Pat. No. 5,126,886 to Richardson et al., the disclosure of which is incorporated herein by reference. The '886 patent uses two or three layers of elongated flexible scrolling substrates coated with light absorbing gels for different subtractive primary colors. In a three-scroll configuration shown in FIG. 2 of the above referenced US patent, each substrate has a surface with a graded portion having a gel of continuously graded concentration along a gradient axis in the elongated direction. The graded distributed gel ranges from a full saturation at one end of the substrate to a total transparent portion at the other end (FIGS. 4, 5, and 6 of the referenced patent). Each substrate corresponds to one subtractive primary color. One drawback of this system is long scrolling time in changing from one primary color (e.g., red) to another (e.g., blue) since at least two of the three substrates have to be scrolled virtually all the way through their respective paths. This can take about two seconds of movement at the full speed operation of a commonly used scrolling motor. Another drawback is the flash of white in the output beam during the above operation along with presence of other intervening colors during the slow scrolling.

The '886 patent further discloses a two-scroll color changer using two dual-hue substrates. The dual-hue substrate combination 200 having a first substrate 210 and a second substrate 220 is illustrated in FIG. 2. The first hue substrate 210 has three sections: a yellow section 12, a transparent portion 214 for white color, and a cyan section 216. The yellow section 212 has a full saturation end portion 213 and the concentration of the absorbing gel for yellow color continuously decreases towards the transparent section 214 along a gradient axis 217 in the elongated direction. The cyan section 216 is similarly constructed, having a full saturation end portion 215 and a continuous decreasing concentration of the absorbing gel for cyan color towards the transparent section 214 along a gradient axis 219. The second hue substrate is similarly constructed with a cyan section 222, a transparent section 224 and a magenta section 226.

The '886 patent's dual-hue configuration still has some of the previously mentioned limitations associated with many of the prior-art scrolling color changers although the flash of white during bumping between primary colors is eliminated. This can be shown in changing the output light from blue to red. Assume that the system initially is set to generate the blue output, thus optic axis 230 being used and both cyan section 216 and magenta section 226 being at the center. An optic axis 234 has to be used to produce the red color. Therefore, the first hue substrate 210 needs to roll almost all the way from one end to the other for changing the output from blue to red. This is a significant duration (e.g., 2 seconds) although no white color is present in the output. However, during the process, the output color goes through other colors in between the red and blue such as magenta as the transparent section 214 of the first substrate scrolls to the center (i.e., optic axis 232 is along the light path).

The present invention describes an improved scrolling color changer system based on a new dual-hue substrate design. In particular, the preferred embodiment of the present invention uses a dual-hue substrate design with five sections and a combination of magenta and yellow in one substrate and a combination of magenta and cyan in another substrate. According to the present invention, the flash of white is eliminated in changing output color between any two primary colors. Importantly, the intervening colors between the two primary colors are eliminated from bumping between any two primary colors. Furthermore, the different color sections in each substrate are designed to minimize the scrolling amount, thus resulting in a high-speed operation that is rarely possible with the prior-art scrolling systems.

The advantages, sophistication, and significance of the present invention will be more apparent in the light of the following detailed description of preferred embodiments thereof, as illustrated in the accompanying drawings.

DESCRIPTION OF THE PREFERRED EMBODIMENTS

Figure 3:
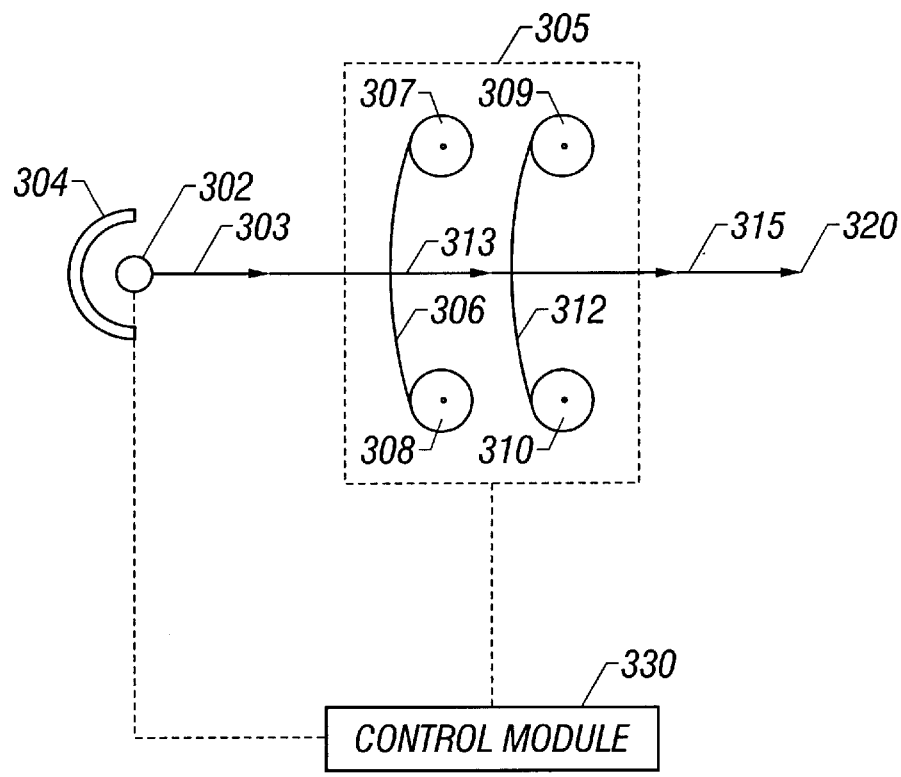
FIG. 3 is a block diagram of a scrolling color changer in accordance with the present invention.

FIG. 3 shows a functional block diagram of a dual-hue scrolling color changer in accordance with the present invention. A white light source 302 with a reflector 304 produces a white light beam 303. The white light beam 303 propagates through a color changer 305.

The color changer 305 preferably has two scrolling optical filters. The first optical filter has a first flexible elongated color filtering substrate 306 coated with two light absorbing gels, each corresponding to a selected hue and a range of saturation. Similarly, the second optical filter has a second flexible elongated color filtering substrate 312 coated with two light absorbing gels, each corresponding to a selected hue and a range of saturation. The selected hues are preferably the three subtractive primary colors, i.e., magenta, yellow and cyan. The first substrate 306 is disposed on a first pair of motor-driven spindles 307 and 308 and the second substrate 312 is disposed on a second pair of motor-driven spindles 309 and 310, respectively. The motor-driven spindles operate to roll the substrates along the elongated direction to position any portion thereof to the center is the optical path of the light beam 303. The optical path of the beam 303 is preferably perpendicular to both substrates 306 and 312.

A control module 330 can vary the intensity of the white light beam 303 from the light source 302 and control the motion of both substrates. The control module 330 further operates to control the hue, saturation, and brightness of the output beam 320.

Figure 4:
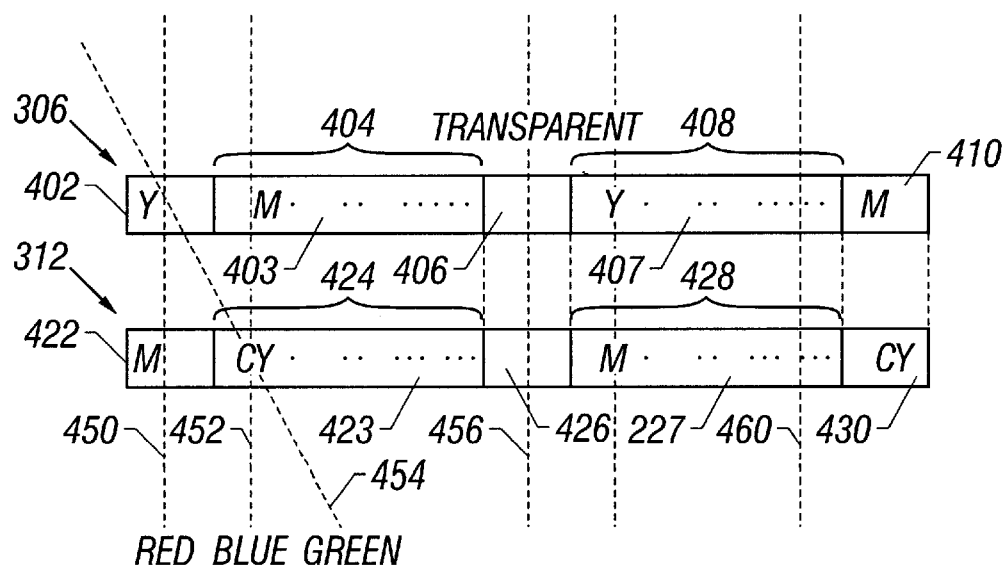
FIG. 4 shows the preferred embodiment of the dual-hue substrates in accordance with the present invention.

FIG. 4 shows the preferred embodiment of the dual-hue substrates 306 and 312 in accordance with the present invention. The substrate 306 of the first color filter has five sections preferably arranged relative to one another as follows in spatial order: a yellow saturation section 402, a graded magenta section 404, a transparent section 406, a graded yellow section 408, and a magenta saturation section 410. The width of the substrate 306 is at least larger than the beam size of the beam 303. The yellow saturation section 402 preferably corresponds to the full saturation yellow point 124 in the color triangle as in FIG. 1, resulting in complete absorption of light of all colors except the selected yellow color. The area of the section 402 should be at least as large as the input beam size of the white beam 303. The graded magenta section 404 has a gel for subtractive magenta of continuously decreasing concentration along a gradient axis in the elongated direction towards the transparent section 406, tracing the magenta pastels on a straight line from point 122 to point 130 in FIG. 1. The section 404 starts with a full saturation area 403 located next to the yellow saturation section 402. The section 404 is generally many time larger than the beam size of beam 303 in the elongated direction dependent on the required resolution in saturation. The transparent section 406 is represented by the white color point 130 in the color triangle of FIG. 1 and is substantially similarly to the section 402 in size. The graded yellow section 408 is substantially similar to the graded magenta section 404 (e.g., the saturation distribution is at the same predetermined gradient) except that the gel is different. The section 408 starts with a yellow saturation area 407 corresponding to the point 124 of FIG. 1 and the concentration of the gel gradually decreases along the gradient axis towards the section 410 corresponding to a color change along the line from point 124 to the white point 130 in FIG. 1. The magenta saturation section 410 indicates the color point 122 in FIG. 1.

The substrate 312 of the second color filter is similarly constructed but has a different color gel arrangement. With respect to the spatial sequence of the substrate 306, the substrate 312 has the following preferable arrangement: a magenta saturation section 422 indicative of the color point 122 of FIG. 1, a graded cyan section 424 indicative of the color line from point 126 to point 130 of FIG. 1, a transparent section 426 for white color, a graded magenta section 428 indicative of the color line from point 122 to point 130 of FIG. 1, and a cyan saturation section 430 represented by point 126 in FIG. 1.

In operation, the scrolling color changer in accordance with the present invention presents significant advantages over the cited prior-art systems. One of the advantages is that the color of the output light beam 320 can be changed between any two primary colors without presence of intervening colors at a high-speed. Another advantage is the complete elimination of the unwanted flash of white in change of hues and saturations. Yet another advantage is faster speed in color switching than the prior art systems. These and other advantages will become more apparent by using the substrate arrangement of FIG. 4 to achieve any desired hues and saturations with reference to the color triangle in FIG. 1.

Figure 1:
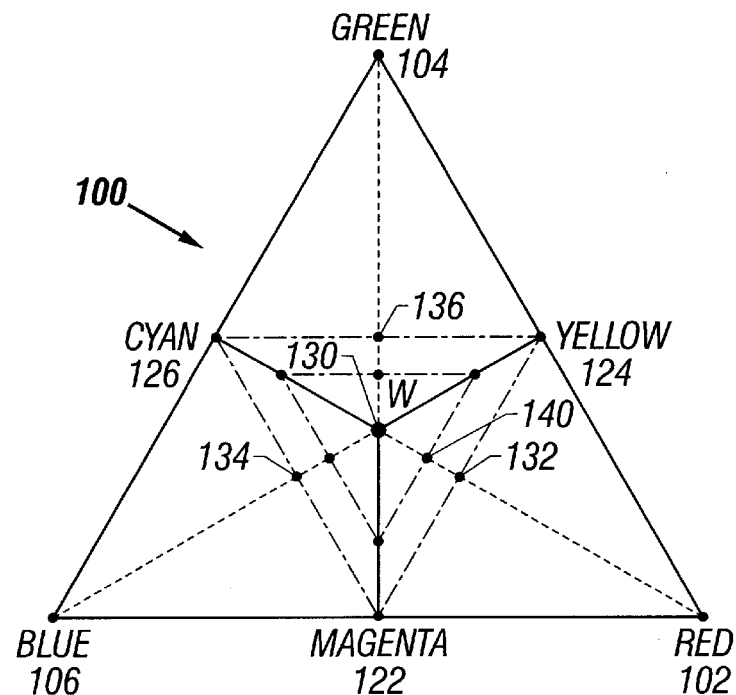
FIG. 1 shows the color triangle.
Figure 2:
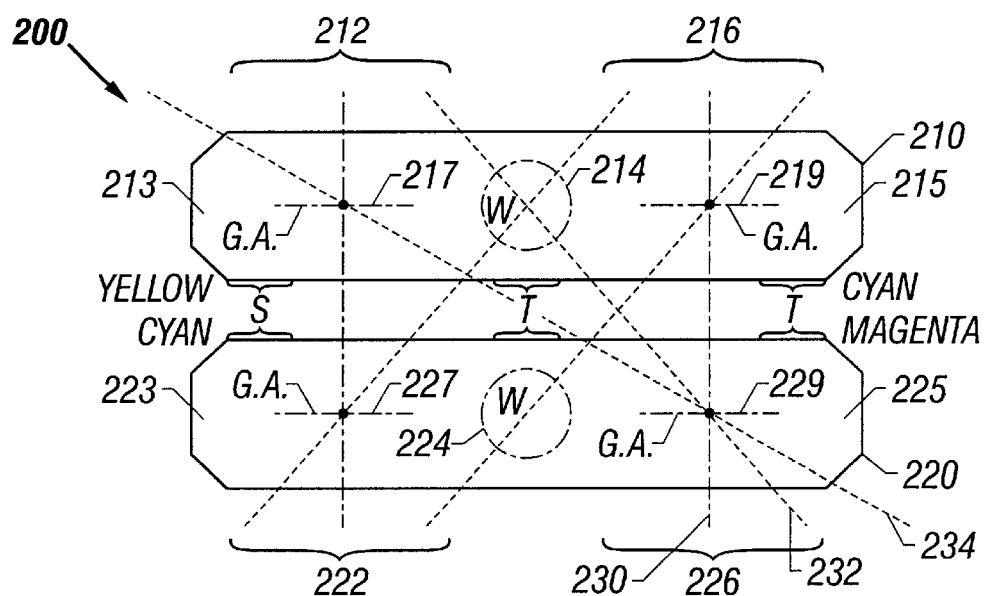
FIG. 2 illustrates a prior-art dual-hue color changer.

For example, optic axis 450 in FIG. 4 represents a red saturation color at point 132 in FIG. 1, optic axis 452 represents a blue saturation color at point 134 in FIG. 1, and optic axis 454 represents a green saturation color at point 136 in FIG. 1, respectively. Assume that the system is initially set to produce the red in the output light 320. To change to the blue, both substrates 306 and 312 will be scrolled simultaneously in the same direction for a short path between the optic axis 450 and the optic axis 452 (i.e., scrolling to the left in FIG. 4). No other colors will be present in the output and the scrolling distance is short. If the red output is changed to green instead, the substrate 312 scrolls to move the magenta section 422 out of the light path and move the adjacent cyan saturation area 423 of the graded cyan section 424 in the light path while the position of the substrate 306 relative to the light path remains unchanged, thus shifting optic axis 450 to optic axis 454. Again, no other colors will be present in the operation and the scrolling path is small. If the above green output needs to change to blue output, the substrate 306 simply scrolls to replace yellow saturation section 402 with its adjacent magenta saturation area 403 in the light path, resulting a change from optic axis 454 to optic axis 452.

If a white output is desired subsequent to the last operation thereabove, both substrates 306 and 312 scroll simultaneously in the same direction over the length of the section 404, switching from optic axis 452 to optic axis 456. If a red pastel at point 140 of FIG. 1 is needed subsequent to the a green output at optic axis 454, both substrates 306 and 312 scroll simultaneously in the same direction with different scrolling speeds, switching from optic axis 454 to optic axis 460 that represents the respective red saturation. No flash of white happens if the scrolling speeds for both substrates are can be controlled to avoid the overlapping the transparent sections 406 and 426.

Although the present invention has been described in detail with reference to a particular embodiment, one ordinarily skilled in the art to which this invention pertains will appreciate that various modifications and enhancements may be made without departing from the spirit and scope of the following claims. For example, while the preferred embodiment does not show collimating optics or projection optics, such could be used with the present invention.

What is claimed is:

1. A combination light filter, comprising:
    a first light filtering element having a plurality of light filtering sections arranged next to one another along a straight line according to a first arrangement;
    said first arrangement including a first saturation section operating to transmit a first selected hue, a first saturation-varying section to transmit a second selected hue being disposed next to said first saturation section and having a saturation distribution continuously decreasing from a high saturation area adjacent to said first saturation section of said first selected hue to a low saturation area, a transparent section being disposed next to said first saturation-varying section adjacent to said low saturation area therein, a second saturation-varying section to transmit said first selected hue being disposed next to said transparent section and having a saturation distribution continuously decreasing from a high saturation area adjacent to said transparent section to a low saturation area, and a second saturation section operating to transmit said second selected hue and being disposed next to said second saturation-varying section adjacent to said low saturation area therein;
    a second light filtering element having a plurality of light filtering sections arranged next to one another along a straight line according to a second arrangement;
    said second arrangement including a first saturation section operating to transmit said second selected hue, a first saturation-varying section to transmit a third selected hue being disposed next to said first saturation section and having a saturation distribution continuously decreasing from a high saturation area adjacent to said first saturation section of said second selected hue to a low saturation area, a transparent section being disposed next to said first saturation-varying section next to said low saturation area therein, a second saturation-varying section to transmit said second selected hue being disposed next to said transparent section and having a saturation distribution continuously decreasing from a high saturation area adjacent to said transparent section to a low saturation area, and a second saturation section operating to transmit said third selected hue and being disposed next to said second saturation-varying section adjacent to said low saturation area therein; and
    a movement element, operating to move said first light filtering element relative to said second light filtering element to produce a desired hue and saturation by subtracting respective complementary hues of an incident light beam passing therethrough.

2. A filter as in claim 1, wherein said first selected hue, said second selected hue, and said third selected hue are subtractive primary hues.

3. A filter as in claim 2, wherein said first selected hue is yellow, said second selected hue is magenta and said third selected hue is cyan.

4. A filter as in claim 1, wherein said saturation-varying sections in said first and second light filtering elements are configured to have a saturation distribution at a common predetermined gradient.

5. A method for color bumping by filtering a white input beam without flash of white, comprising:
    filtering a white input beam with a first light filtering element to produce a first filtered beam, said first light filtering element comprising a plurality of light filtering sections arranged relative to one another in a linear fashion which includes: a first saturation section to transmit a first selected hue, a first saturation-varying section to transmit a second selected hue being disposed next to said first saturation section and having a saturation distribution continuously decreasing from a high saturation area adjacent to said first saturation section of said first selected hue to a low saturation area, a transparent section being disposed next to said first saturation-varying section adjacent to said low saturation area therein, a second saturation-varying section to transmit said first selected hue being disposed next to said transparent section and having a saturation distribution continuously decreasing from a high saturation area adjacent to said transparent section to a low saturation area, and a second saturation section operating to transmit said second selected hue and being disposed next to said second saturation-varying section adjacent to said low saturation area therein;
    receiving said first filtered beam with a second light filtering element to produce an output beam of a desired color and saturation level, said second light filtering element comprising a plurality of light filtering sections arranged relative to one another in a linear fashion which includes: a first saturation section to transmit said second selected hue, a first saturation-varying section to transmit a third selected hue being disposed next to said first saturation section and having a saturation distribution continuously decreasing from a high saturation area adjacent to said first saturation section of said second selected hue to a low saturation area, a transparent section being disposed next to said first saturation-varying section next to said low saturation area therein, a second saturation-varying section to transmit said second selected hue being disposed next to said transparent section and having a saturation distribution continuously decreasing from a high saturation area adjacent to said transparent section to a low saturation area, and a second saturation section operating to transmit said third selected hue and being disposed next to said second saturation-varying section adjacent to said low saturation area therein; and moving said first filter relative to said second filter in such a way to eliminate overlapping of said transparent sections in said first and second filters and to produce said desired color and saturation level.

6. A color filtering system for filtering a white input beam to produce a colored output beam, comprising:

a first light filtering element configured to have a plurality of light filtering sections arranged relative to one another in a linear fashion and positioned to receive a white input beam to produce a first filtered beam, wherein said first light filtering element includes: a first saturation section to transmit a first selected hue, a first saturation-varying section to transmit a second selected hue being disposed next to said first saturation section and having a spatially-graded saturation distribution, a transparent section disposed next to said first saturation-varying section, a second saturation-varying section to transmit said first selected hue being disposed next to said transparent section and having a spatially-graded saturation distribution, and a second saturation section operating to transmit said second selected hue and being disposed next to said second saturation-varying section;

a second light filtering element configured to have a plurality of light filtering sections arranged relative to one another in a linear fashion and positioned relative to said first light filtering element to receive said first filtered beam to produce a second filtered beam, wherein said second light filtering element includes: a first saturation section to transmit a third selected hue, a first saturation-varying section to transmit a fourth selected hue being disposed next to said first saturation section and having a spatially-graded saturation distribution, a transparent section disposed next to said first saturation-varying section, a second saturation-varying section to transmit said third selected hue being disposed next to said transparent section and having a spatially-graded saturation distribution, and a second saturation section operating to transmit said fourth selected hue and being disposed next to said second saturation-varying section, wherein one of said first and second selected hues in said first filter is identical to one of said third and fourth selected hues in said second filter; and a movement element, operating to move said first light filtering element relative to said second light filtering element to align one light filtering section in said first light filtering element with another light filtering section in said second light filtering element to eliminate overlapping of said transparent sections in said first and second light filtering elements and to produce said desired color and saturation level in said second filtered beam.

7. A system as in claim 6, wherein said first, second, third, and fourth selected hues are subtractive primary hues.

8. A filter as in claim 7, wherein said first selected hue is yellow, said second and third selected hues are magenta, and said fourth selected hue is cyan.

9. A methods for filtering a white input beam to change colors in a filtered output beam without flash of white, comprising:

filtering a white input beam with a first light filtering element to produce a first filtered beam, said first light filtering element configured to have a plurality of light filtering sections arranged relative to one another in a linear fashion, which includes: a first saturation section to transmit a first selected hue, a first saturation-varying section to transmit a second selected hue being disposed next to said first saturation section and having a spatially-graded saturation distribution, a transparent section disposed next to said first saturation-varying section, a second saturation-varying section to transmit said first selected hue being disposed next to said transparent section and having a spatially-graded saturation distribution, and a second saturation section operating to transmit said second selected hue and being disposed next to said second saturation-varying section;

receiving said first filtered beam with a second light filtering element to produce a second filtered beam, said second light filtering element configured to have a plurality of light filtering sections arranged relative to one another in a linear fashion, which includes: a first saturation section to transmit a third selected hue, a first saturation-varying section to transmit a fourth selected hue being disposed next to said first saturation section and having a spatially-graded saturation distribution, a transparent section disposed next to said first saturation-varying section, a second saturation-varying section to transmit said third selected hue being disposed next to said transparent section and having a spatially-graded saturation distribution, and a second saturation section operating to transmit said fourth selected hue and being disposed next to said second saturation-varying section, wherein one of said first and second selected hues in said first filter is identical to one of said third and fourth selected hues in said second filter; and moving said first light filtering element relative to said second light filtering element to align one light filtering section in said first light filtering element with another light filtering section in said second light filtering element to eliminate overlapping of said transparent sections in said first and second light filters elements.

* * * * *